(12) United States Patent
Wang et al.

(10) Patent No.: US 11,941,209 B2
(45) Date of Patent: Mar. 26, 2024

(54) TOUCH MODULE, PREPARATION METHOD THEREFOR, AND DISPLAY DEVICE

(71) Applicant: BOE Technology Group Co., Ltd., Beijing (CN)

(72) Inventors: Jiuzhen Wang, Beijing (CN); Meizhu Zheng, Beijing (CN); Lupeng Bian, Beijing (CN); Biao Gao, Beijing (CN); Zebang Guo, Beijing (CN); Xiongnan Zhang, Beijing (CN); Boyang Shi, Beijing (CN); Shengxing Zhang, Beijing (CN); Jian Cai, Beijing (CN); Dalin Xiang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 2 days.

(21) Appl. No.: 17/630,128

(22) PCT Filed: Apr. 19, 2021

(86) PCT No.: PCT/CN2021/088210
§ 371 (c)(1),
(2) Date: Jan. 25, 2022

(87) PCT Pub. No.: WO2021/258827
PCT Pub. Date: Dec. 30, 2021

(65) Prior Publication Data
US 2022/0261102 A1    Aug. 18, 2022

(30) Foreign Application Priority Data

Jun. 24, 2020   (CN) .......................... 202010587310.3

(51) Int. Cl.
*G06F 3/044*    (2006.01)
*B32B 27/32*    (2006.01)
*B32B 37/02*    (2006.01)

(52) U.S. Cl.
CPC ............ *G06F 3/044* (2013.01); *B32B 27/325* (2013.01); *B32B 37/02* (2013.01);
(Continued)

(58) Field of Classification Search
CPC .......... G06F 3/044; G06F 2203/04103; G06F 2203/04102; B32B 7/12; B32B 37/02;
(Continued)

(56) References Cited

U.S. PATENT DOCUMENTS

2010/0066683 A1* 3/2010 Chang .................. B32B 37/025
345/173
2018/0112049 A1 4/2018 Song et al.
(Continued)

FOREIGN PATENT DOCUMENTS

CN   106024840 A   10/2016
CN   106558279 A   4/2017
(Continued)

*Primary Examiner* — Hong Zhou
(74) *Attorney, Agent, or Firm* — IPro, PLLC

(57) ABSTRACT

Provides in the present disclosure are a touch module, a preparation method therefor, and a display device. The touch module is formed by means of attaching a polarizing function layer to a side of a touch function layer by a first bonding layer; attaching a cyclo olefin polymer (COP) film layer to another side of the touch function layer by a second bonding layer; and attaching a third bonding layer to a side, facing away from the second bonding layer, of the COP film layer.

9 Claims, 10 Drawing Sheets

(52) U.S. Cl.
CPC .................. *B32B 2457/208* (2013.01); *G06F 2203/04102* (2013.01); *G06F 2203/04103* (2013.01)

(58) Field of Classification Search
CPC ............ B32B 27/325; B32B 2457/208; B32B 2307/42; B32B 2255/28; B32B 2255/10
See application file for complete search history.

(56) References Cited

U.S. PATENT DOCUMENTS

| | | | |
|---|---|---|---|
| 2018/0364834 A1* | 12/2018 | Kwon | G06F 3/0446 |
| 2018/0366661 A1 | 12/2018 | Wang et al. | |
| 2019/0025970 A1* | 1/2019 | Kim | G06F 3/0414 |
| 2020/0089347 A1* | 3/2020 | Baek | G06F 3/041 |
| 2021/0191468 A1 | 6/2021 | Nakamura et al. | |
| 2021/0208729 A1* | 7/2021 | Park | G06F 3/0443 |
| 2021/0286457 A1* | 9/2021 | Kim | G06F 3/04164 |
| 2022/0139591 A1* | 5/2022 | Yamaki | C08K 7/06 345/173 |
| 2022/0230774 A1* | 7/2022 | Yamaki | B32B 27/32 |

FOREIGN PATENT DOCUMENTS

| | | |
|---|---|---|
| CN | 107861659 A | 3/2018 |
| CN | 107976724 A | 5/2018 |
| CN | 110192173 A | 8/2019 |
| CN | 110515499 A | 11/2019 |
| CN | 111752415 A | 10/2020 |
| CN | 112447792 A | 3/2021 |
| EP | 4020576 A1 | 6/2022 |
| WO | 2020044171 A1 | 3/2020 |

* cited by examiner

TOUCH MODULE, PREPARATION METHOD THEREFOR, AND DISPLAY DEVICE

CROSS REFERENCE TO RELATED APPLICATIONS

The present disclosure is a national phase entry under 35 U.S.C § 371 of International Application No. PCT/CN2021/088210, filed Apr. 19, 2021, which claims priority to Chinese Patent Application No. 202010587310.3, entitled "TOUCH MODULE AND PREPARATION METHOD THEREOF, AND DISPLAY DEVICE", filed to the China National Intellectual Property Administration on Jun. 24, 2020, the entire contents of which are incorporated herein by reference.

FIELD

The present disclosure relates to the field of touch display, in particular to a touch module, a preparation method therefor, and a display device.

BACKGROUND

With the development of the display industry, various designs of panels have emerged, and foldable panels is one of the leaders, being outstanding in many designs. However, the development of foldable panels has been troubled by the extreme challenge of all kinds of materials. As one of the functional components, touch modules have been regarded as the most important, and all kinds of effective designs have been developed around their foldability. A foldable touch module needs to have a strong resistance to bending, which requires a thin material, but the infinite thinning of the material will lead to bending reliability problems, as well as the panel itself to become noisy and other problems.

SUMMARY

Embodiments of the present disclosure provide a method for preparing a touch module, including:
attaching a polarizing function layer and a cyclo olefin polymer (COP) film layer to both sides of a touch function layer by a first bonding layer and a second bonding layer respectively, and attaching a third bonding layer to a side, facing away from the second bonding layer, of the COP film layer.

Optionally, in the method provided by the embodiments of the present disclosure, the attaching the polarizing function layer and the COP film layer to both sides of the touch function layer by the first bonding layer and the second bonding layer respectively, includes:
attaching the first bonding layer on the polarizing function layer;
transferring the touch function layer pre-formed on a rigid base substrate to the first bonding layer by means of transfer printing; and
attaching the COP film layer on the touch function layer through the second bonding layer.

Optionally, the method provided by the embodiments of the present disclosure, before the transferring the touch function layer pre-formed on the rigid base substrate to the first bonding layer by means of transfer printing, the method further includes:
removing a preset area of the polarizing function layer; wherein after the touch function layer is transferred to the first bonding layer, neither the polarizing function layer nor the first bonding layer overlaps with a binding area of the touch function layer in a direction perpendicular to the touch function layer; and
the preparation method, after the transferring the touch function layer pre-formed on the rigid base substrate to the first bonding layer by means of transfer printing, the method further includes:
binding a printed circuit board in the binding area of the touch function layer.

Optionally, in the method provided by the embodiments of the present disclosure, the attaching the polarizing function layer and the COP film layer to both sides of the touch function layer by the first bonding layer and the second bonding layer respectively, includes:
attaching the second bonding layer on the COP film layer;
transferring the touch function layer pre-formed on a rigid base substrate to the second bonding layer by means of transfer printing; and
attaching the polarizing function layer on the touch function layer through the first bonding layer.

Optionally, the method provided by the embodiments of the present disclosure, before the attaching the polarizing function layer on the touch function layer through the first bonding layer, further includes:
attaching the first bonding layer on the polarizing function layer;
removing a preset area of the polarizing function layer and a preset area of the first bonding layer; wherein after the attaching the polarizing function layer on the touch function layer, neither the polarizing function layer nor the first bonding layer overlaps with a binding area of the touch function layer in a direction perpendicular to the touch function layer; and
binding a printed circuit board in the binding area of the touch function layer.

Optionally, in the method provided by the embodiments of the present disclosure, pre-forming the touch function layer on the rigid base substrate, includes:
forming a transfer-printing support layer on the rigid base substrate; and
forming the touch function layer on the transfer-printing support layer.

Optionally, the method provided by the embodiments of the present disclosure, before the COP film layer is attached to the second bonding layer, further includes: performing plasma treatment on a surface, to be attached to the second bonding layer, of the COP film layer.

Optionally, the method provided by the embodiments of the present disclosure, before the COP film layer is attached to the third bonding layer, further includes: performing plasma treatment on a surface, to be attached to the third bonding layer, of the COP film layer.

Correspondingly, the embodiments of the present disclosure further provide a touch module, wherein the touch module is prepared by adopting any one of the above preparation methods; and
the touch module includes: the polarizing function layer, the first bonding layer, the touch function layer, the second bonding layer, the COP film layer and the third bonding layer arranged successively in a stacked mode.

Optionally, in the touch module provided by the embodiments of the present disclosure, neither the polarizing function layer nor the first bonding layer overlaps with a binding area of the touch function layer in a direction perpendicular to the touch function layer; and the touch module further includes a printed circuit board bound in the binding area of the touch function layer.

Correspondingly, the embodiments of the present disclosure further provide a display device, the display device includes a display panel and the touch module provided by the embodiments of the present disclosure and arranged on a light emitting side of the display panel; and the third bonding layer in the touch module is attached to the display panel.

Optionally, the display device provided by the embodiments of the present disclosure, further includes: a cover plate arranged on a side, facing away from the display panel, of the touch module; and when the touch module includes a printed circuit board, the display device further includes a frame sealant filling between the cover plate and the printed circuit board.

DETAILED DESCRIPTION OF THE EMBODIMENTS

Figure 1:
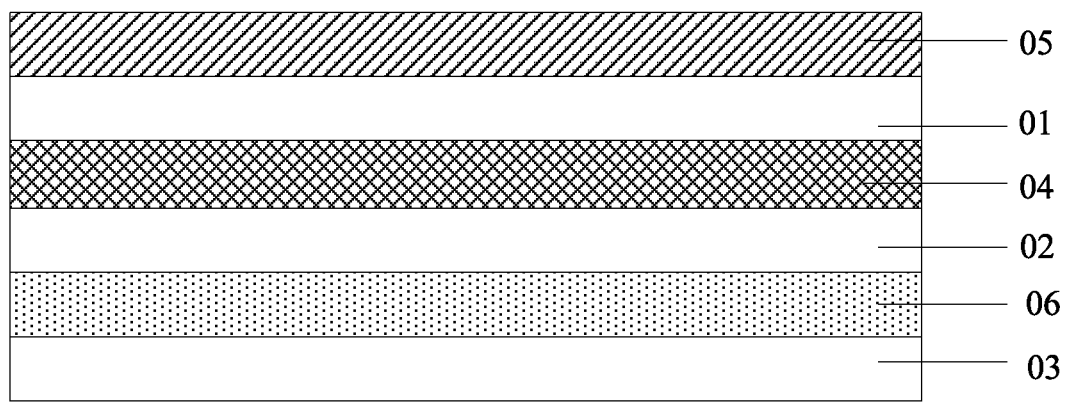
FIG. 1 is a schematic structural diagram of a touch module provided by some embodiments of the present disclosure.

In order to make the above objects, features and advantages of the present disclosure more apparent and understandable, the present disclosure will be further described below in connection with the accompanying drawings and embodiments. However, the example implementations can be implemented in a variety of forms and should not be construed as being limited to the implementations described herein; rather, providing these implementations makes the present disclosure more comprehensive and complete and communicates the ideas of the example implementations to those of skill in the art in a comprehensive manner. Accompanying drawing references in the drawings indicate the same or similar structures, and thus repetitive descriptions of them will be omitted. Words used to express position and orientation described in the present disclosure are illustrated using the accompanying drawings as examples, but changes may be made as needed, and any changes made are included in the scope of protection of the present disclosure. The accompanying drawings of the present disclosure are used only to show the relative position relationship, but do not represent the true scale.

It is noted that specific details are described in the following description to facilitate a full understanding of the present disclosure. However, the present disclosure can be implemented in a variety of other ways different from those described herein, and those of skill in the art can make similar extensions without contradicting the context of the present disclosure. The present disclosure is therefore not limited by the specific implementations disclosed below. The description that follows is preferred implementations of the present disclosure, but the description is intended to illustrate the general principles of the present disclosure and is not intended to limit the scope of the present disclosure. The scope of protection of the present disclosure shall be as defined in the appended claims.

A touch module and a preparation method therefor and a display device provided by embodiments of the present disclosure are described specifically below in conjunction with the accompanying drawings.

The embodiment of the present disclosure provides a method for preparing a touch module, including:

as shown in FIG. 1, a polarizing function layer 05 and a cyclo olefin polymer (COP) film layer 06 are attached to both sides of a touch function layer 04 by a first bonding layer 01 and a second bonding layer 02 respectively, such as, the polarizing function layer is attached to a side of the touch function layer by 04 the first bonding layer 01, and the COP film layer to another side of the touch function layer 04 by the second bonding layer 02, and a third bonding layer 03 is attached to a side, facing away from the second bonding layer 02, of the COP film layer 06.

According to the method for preparing the touch module provided by the embodiments of the present disclosure, the polarizing function layer and the COP film layer are attached to both sides of the touch function layer by the first bonding layer and the second bonding layer respectively, and the third bonding layer is attached to the side, facing away from the second bonding layer, of the COP film layer, so that the touch module can be attached to a display panel by the third bonding layer. The method has a relatively simple process flow and effectively reduces the noise of the display panel by having the second bonding layer, the COP film layer and the third bonding layer between the touch function layer and the display panel, thereby increasing a distance between the touch function layer and the display panel. Moreover, the COP film layer can play a role of protection support, while the bonding layers can improve an effect of film layer rubbing, as well as adjust an effect of a bending neutral layer of a material, thus effectively regulating a force layer of the touch module, enhancing overall tensile resistance of the touch module, and finally ensuring that the overall touch module has an excellent bending characteristic.

It should be noted that the method provided by the embodiments of the present disclosure is sufficient as long as the polarizing function layer, the first bonding layer, the touch function layer, the second bonding layer, the COP film layer and the third bonding layer can be attached together, and there is no limitation to the order of attachment of the film layers.

In an optional implementation, the touch function layer can be transfer-printed to the first bonding layer supported by the polarizing function layer first, or the touch function layer can be transfer-printed to the second bonding layer supported by the COP film layer first, as explained respectively below.

Accordingly, when the touch function layer is first transfer-printed to the first bonding layer supported by the polarizing function layer, in the method by the embodiments of the present disclosure, the attaching the polarizing function layer and the COP film layer to both sides of the touch function layer by the first bonding layer and the second bonding layer respectively, includes:

the first bonding layer is attached on the polarizing function layer;

the touch function layer pre-formed on a rigid base substrate is transferred to the first bonding layer by means of transfer printing; and the COP film layer is attached to the touch function layer through the second bonding layer.

Optionally, the method by the embodiments of the present disclosure, before the transferring the touch function layer pre-formed on the rigid base substrate to the first bonding layer by means of transfer printing, the method further includes:

a preset area of the polarizing function layer is removed, so after the touch function layer is transferred to the first bonding layer, neither the polarizing function layer nor the first bonding layer overlaps with a binding area of the touch function layer in a direction perpendicular to the touch function layer; and after the transferring the touch function layer pre-formed on the rigid base substrate to the first bonding layer by means of transfer printing, the method further includes:

a printed circuit board is bound in the binding area of the touch function layer.

Accordingly, when the touch function layer is first transfer-printed to the second bonding layer supported by the COP film layer, in the method by the embodiments of the present disclosure, the attaching the polarizing function layer and the COP film layer to both sides of the touch function layer by the first bonding layer and the second bonding layer respectively, includes:

the second bonding layer is attached on the COP film layer;

the touch function layer pre-formed on a rigid base substrate is transferred to the second bonding layer by means of transfer printing; and the polarizing function layer is attached on the touch function layer through the first bonding layer.

Optionally, the method by the embodiments of the present disclosure, before the attaching the polarizing function layer on the touch function layer through the first bonding layer, the method further includes:

the first bonding layer is attached on the polarizing function layer;

a preset area of the polarizing function layer and a preset area of the first bonding layer are removed, so after the attaching the polarizing function layer on the touch function layer, neither the polarizing function layer nor the first bonding layer overlaps with a binding area of the touch function layer in a direction perpendicular to the touch function layer; and a printed circuit board is bound in the binding area of the touch function layer.

In the above method by the embodiments of the present disclosure, whether the touch function layer is first transfer-printed to the first bonding layer supported by the polarizing function layer, or the touch function layer is first transfer-printed to the second bonding layer supported by the COP film layer, the touch function layer is formed on the rigid base substrate in advance, and then the touch function layer is transferred by means of transfer printing. Forming the touch function layer on the rigid base substrate in advance can effectively ensure the manufacturing process of the touch function layer, and make a thickness of the touch function layer small and film uniformity good, so that the overall touch module has an excellent bendable characteristic.

Figure 2:
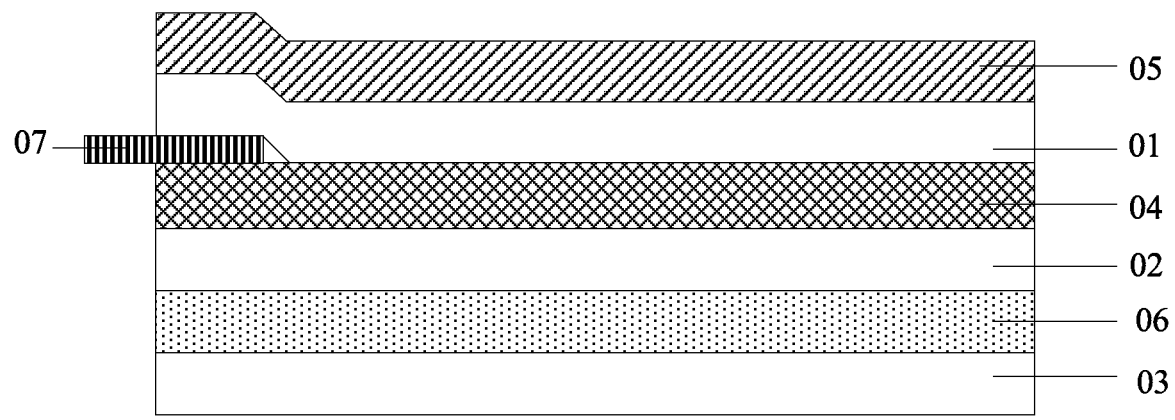
FIG. 2 is a schematic structural diagram of another touch module provided by some embodiments of the present disclosure.

Further, in the example above, in the binding area of the touch function layer, due to the printed circuit board is bound, if the preset area of the polarizing function layer is not removed, as shown in FIG. 2, when the polarizing function layer 05 is attached to the touch function layer 04 bound with the printed circuit board 07 through the first bonding layer 01, there will be a certain height difference in the binding area, and thus tiny air bubbles will be generated at the gap. For a non-bendable touch module, after the touch module is attached to the display panel, the whole structure no longer produces mechanical changes, and the original shapes of the air bubbles can be maintained, so in the related art, a breakage difference of the area is generally reduced by reducing a thickness of the printed circuit board in the binding area, so that the durability of the module is improved. But for a bendable touch module, a force of an edge of the touch module will increase in a bend state, which makes the air bubbles of the area always in a state of force stretching, thereby leading to the expansion of the air bubbles of the binding area. The expansion of the air bubbles will cause a large number of water and oxygen to enter the binding area, thus affecting the appearance and function of the product.

Figure 3A:
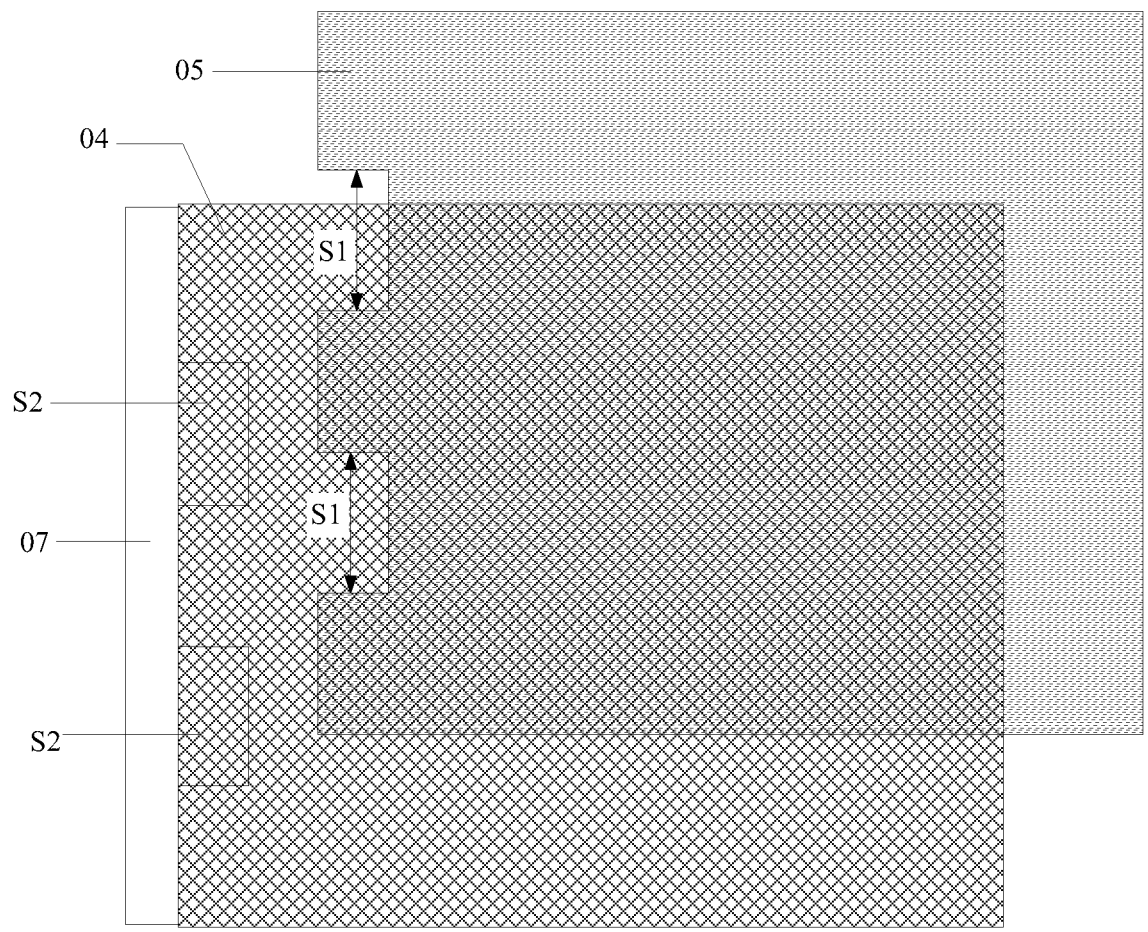
FIG. 3a is a schematic top view of a polarizing function layer and a touch function layer of a touch module provided by some embodiments of the present disclosure before attaching.
Figure 3B:
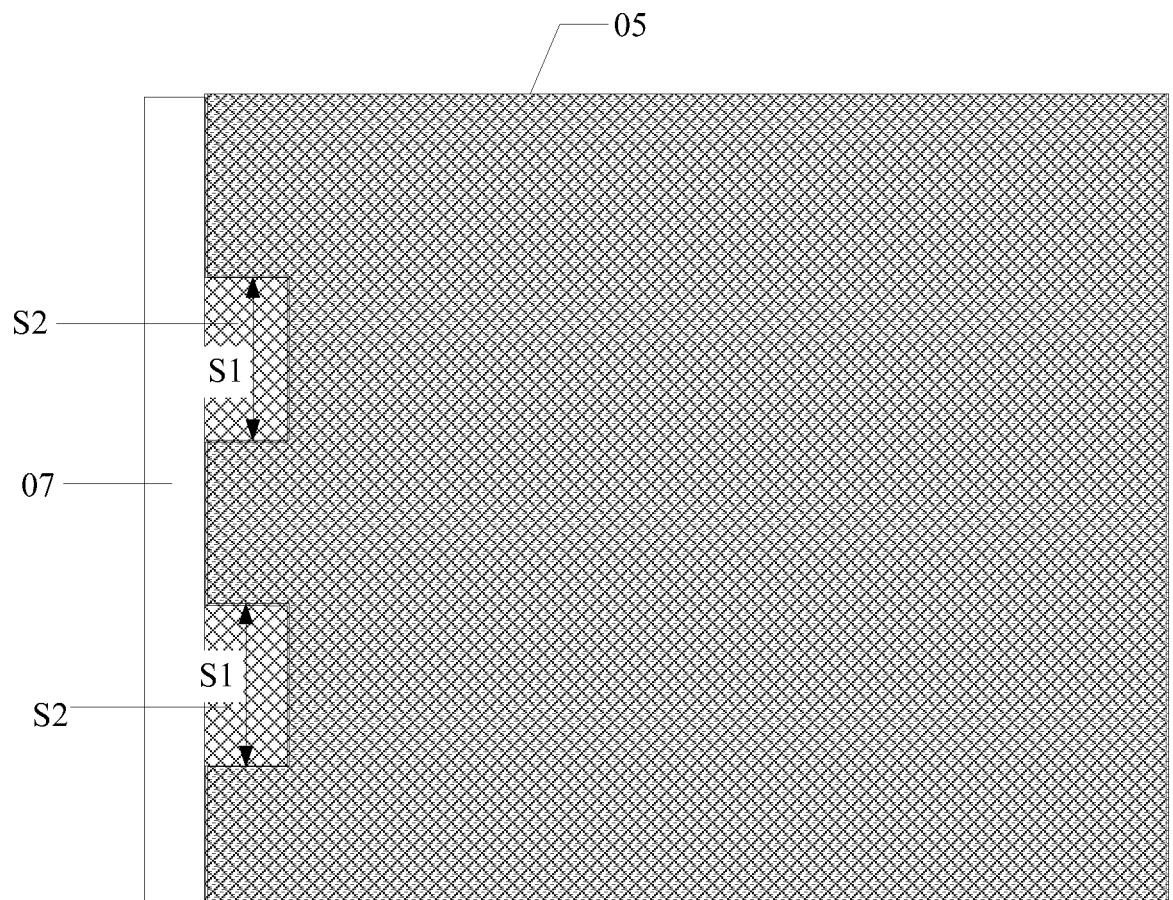
FIG. 3b is a schematic top view of a polarizing function layer and a touch function layer of a touch module provided by some embodiments of the present disclosure after attaching.
Figure 3C:
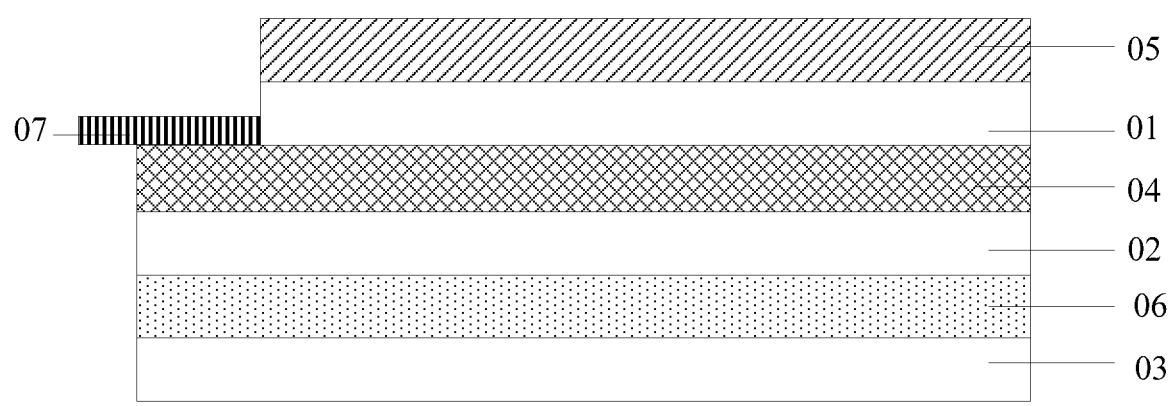
FIG. 3c is a schematic sectional view of the touch module shown in FIG. 3b.

Therefore, in the embodiments of the present disclosure, as shown in FIGS. 3a to 3c, the preset area S1 of the polarizing function layer 05 is removed. After the polarizing function layer 05 is attached to the touch function layer 04 bound with the printed circuit board 07 through the first bonding layer 01, neither the polarizing function layer 05 nor the first bonding layer 01 overlaps with the binding area S2 of the touch function layer 04 in the direction perpendicular to the touch function layer 04, thus avoiding the generation of the air bubbles between the printed circuit board 07 and the first bonding layer 01.

In an optional implementation, in the preparation method provided by the embodiments of the present disclosure, an area of the preset area S1 is at least equal to an area of the binding area S2. Taking into account that there may be a certain alignment error between a touch electrode layer and the polarizing function layer, the area of the preset area S1 can be set to be larger than the area of the binding area S2.

Further, in the method provided by the embodiments of the present disclosure, the area of the preset area S1 may be set after the touch electrode layer and the polarizing function layer are attached, and a distance from an edge of the first bonding layer to an edge of the printed circuit board is about 200 µm.

In an optional implementation, the embodiments of the present disclosure does not limit the way to remove the preset area of the polarizing function layer, which may be performed by any cutting process and is not limited here. However, since a laser process for cutting has the advantages of high precision, high speed, narrow slit, small heat-affected area, smooth and burr-free cutting surface, etc., optionally, in the method provided by the embodiments of the present disclosure, the laser process may be adopted to remove the preset area of the polarizing function layer.

Optionally, in the method provided by the embodiments of the present disclosure, pre-forming the touch function layer on the rigid base substrate, includes:

a transfer-printing support layer is formed on the rigid base substrate; and the touch function layer is formed on the transfer-printing support layer.

In an optional implementation, the present disclosure does not specifically limit the structure of the touch function layer, and the touch function layer may be a self-capacitance structure or a mutual capacitance structure.

Figure 4:
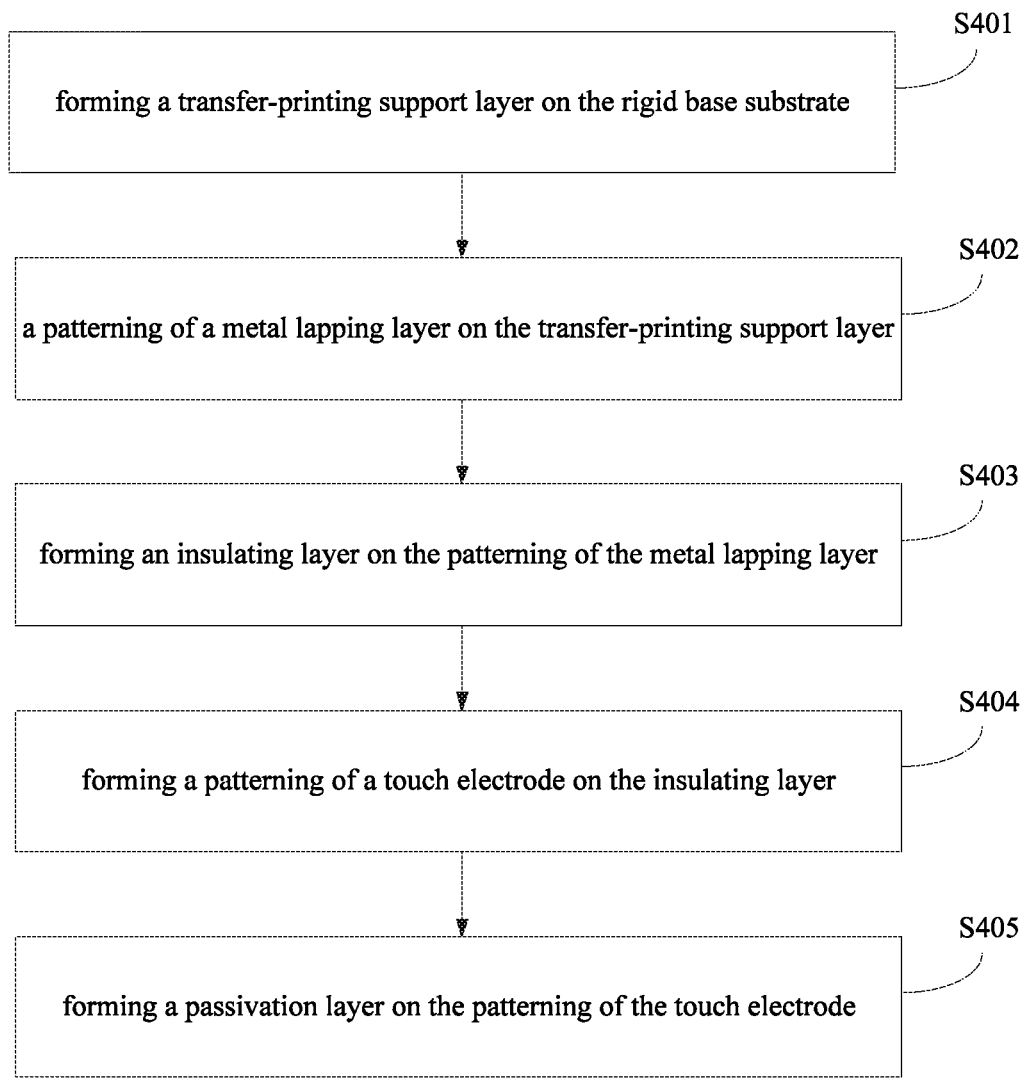
FIG. 4 is a flow chart of forming a touch function layer of a preparation method provided by some embodiments of the present disclosure.
Figure 5:
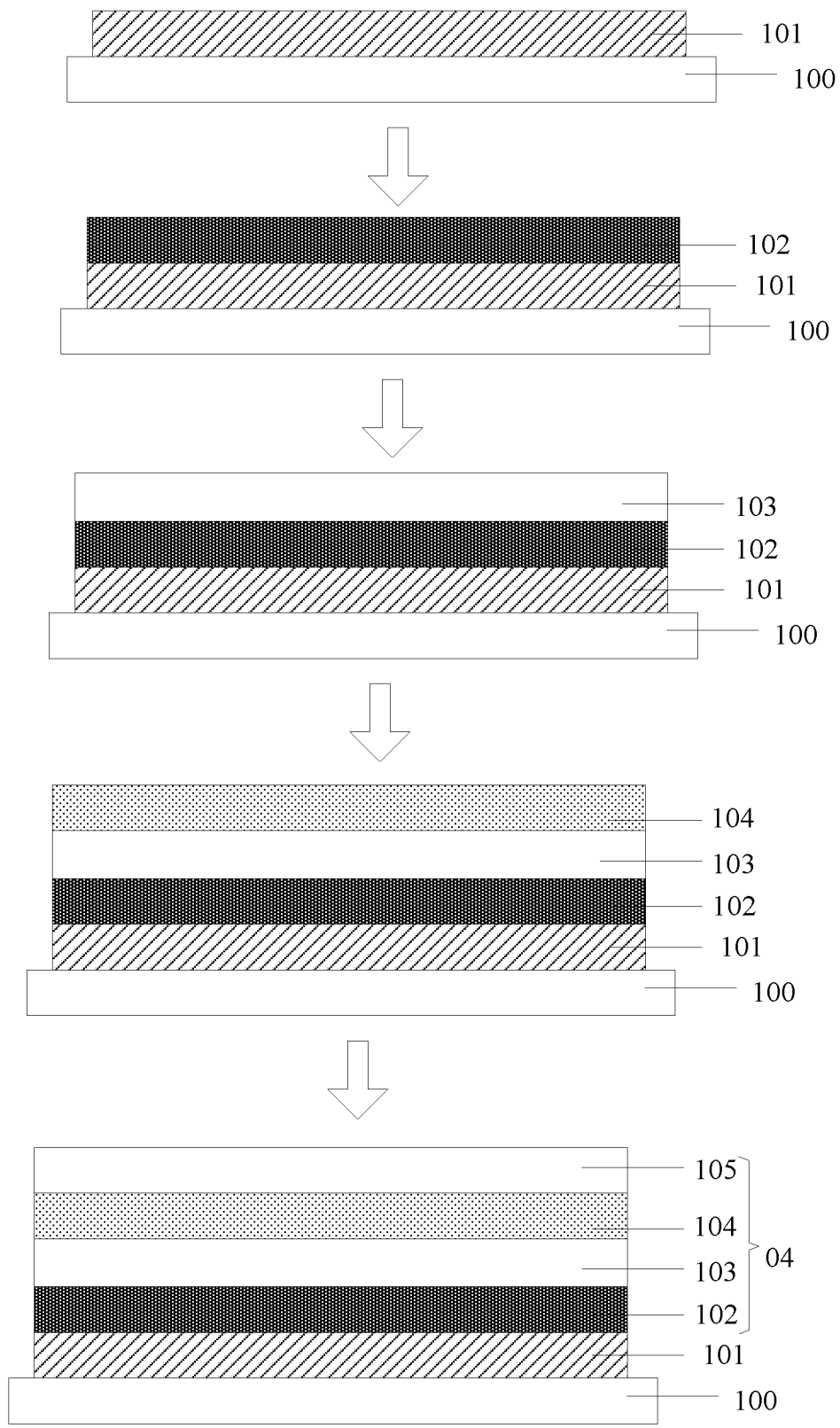
FIG. 5 is a schematic structural diagram corresponding to each step when adopting the preparation method shown in FIG. 4.

Accordingly, taking that the touch function layer is a mutual capacitance structure as an example, a flow chart of pre-forming the touch function layer on the rigid base substrate is shown in FIG. 4, includes:

S401, forming a transfer-printing support layer 101 on the rigid base substrate 100, as shown in FIG. 5.

In an optional implementation, the rigid base substrate may be a glass substrate, and the glass substrate is coated with the transfer-printing support layer of about 3 μm to support and transfer-print the touch function layer formed subsequently.

S402, forming a patterning of a metal lapping layer 102 on the transfer-printing support layer 101, as shown in FIG. 5.

In an optional implementation, a metal layer is formed on the transfer-printed support layer first, and then pattern of lapping electrodes and the pattern of leads are formed by a composition process.

S403, forming an insulating layer 103 on the patterning of the metal lapping layer 102, as shown in FIG. 5.

S404, forming a patterning of a touch electrode 104 on the insulating layer 103, as shown in FIG. 5.

In an optional implementation, a transparent conductive layer, such as an ITO layer, may be vaporized on the insulating layer, and then the patterning of the touch electrode may be formed in the transparent conductive layer by the composition process.

S405, forming a passivation layer 105 on the patterning of the touch electrode 104, as shown in FIG. 5.

In an optional implementation, the passivation layer can play a protective support role, while the passivation layer will be attached to the first bonding layer.

Accordingly, the above embodiments are based on the transfer-printing of the touch function layer to the first bonding layer attached to the polarizing function layer for illustrating. In an optional implementation, the order of formation of each film layer in the touch function layer is related to the structure of the touch function layer and whether the subsequent touch function layer is attached to the first bonding layer or to the second bonding layer first, which is not specifically limited here.

Optionally, the method provided by the embodiments of the present disclosure, before the COP film layer is attached to the second bonding layer, the method further includes: performing plasma treatment on a surface, to be attached to the second bonding layer, of the COP film layer to enhance a bonding of the COP film layer to the second bonding layer.

Optionally, the method provided by the embodiments of the present disclosure, before the COP film layer is attached to the third bonding layer, further includes: performing plasma treatment on a surface, to be attached to the third bonding layer, of the COP film layer to enhance a bonding of the COP film layer to the third bonding layer.

In an optional implementation, in the method provided by the embodiments of the present disclosure, a material of the bonding layers may be a pressure sensitive adhesive (PSA), which is not limited here.

The method provided by the embodiments of the present disclosure is described below by specific embodiments.

Figure 6:
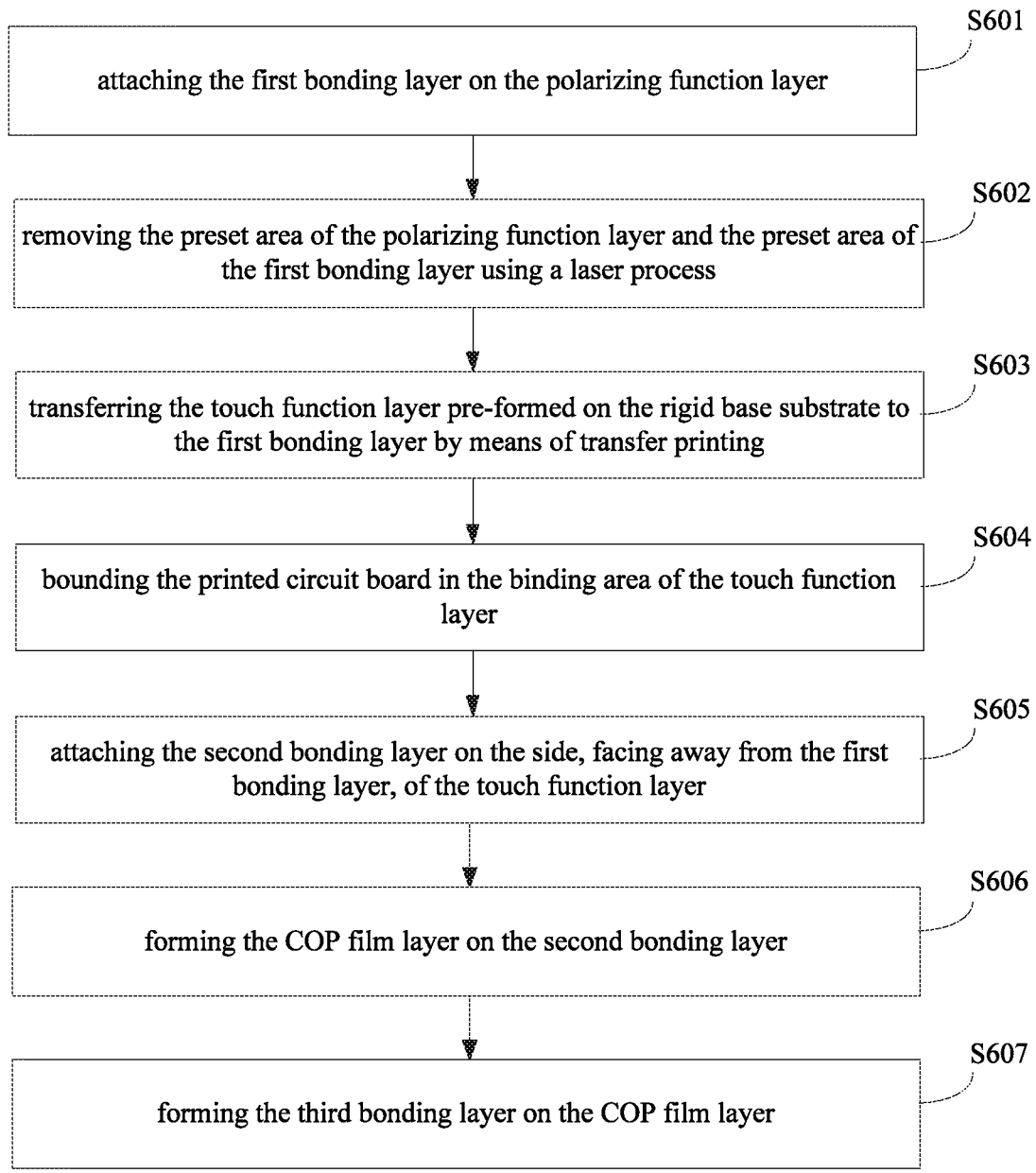
FIG. 6 is a flow chart of a method for preparing a touch module provided by some embodiments of the present disclosure.
Figure 7:
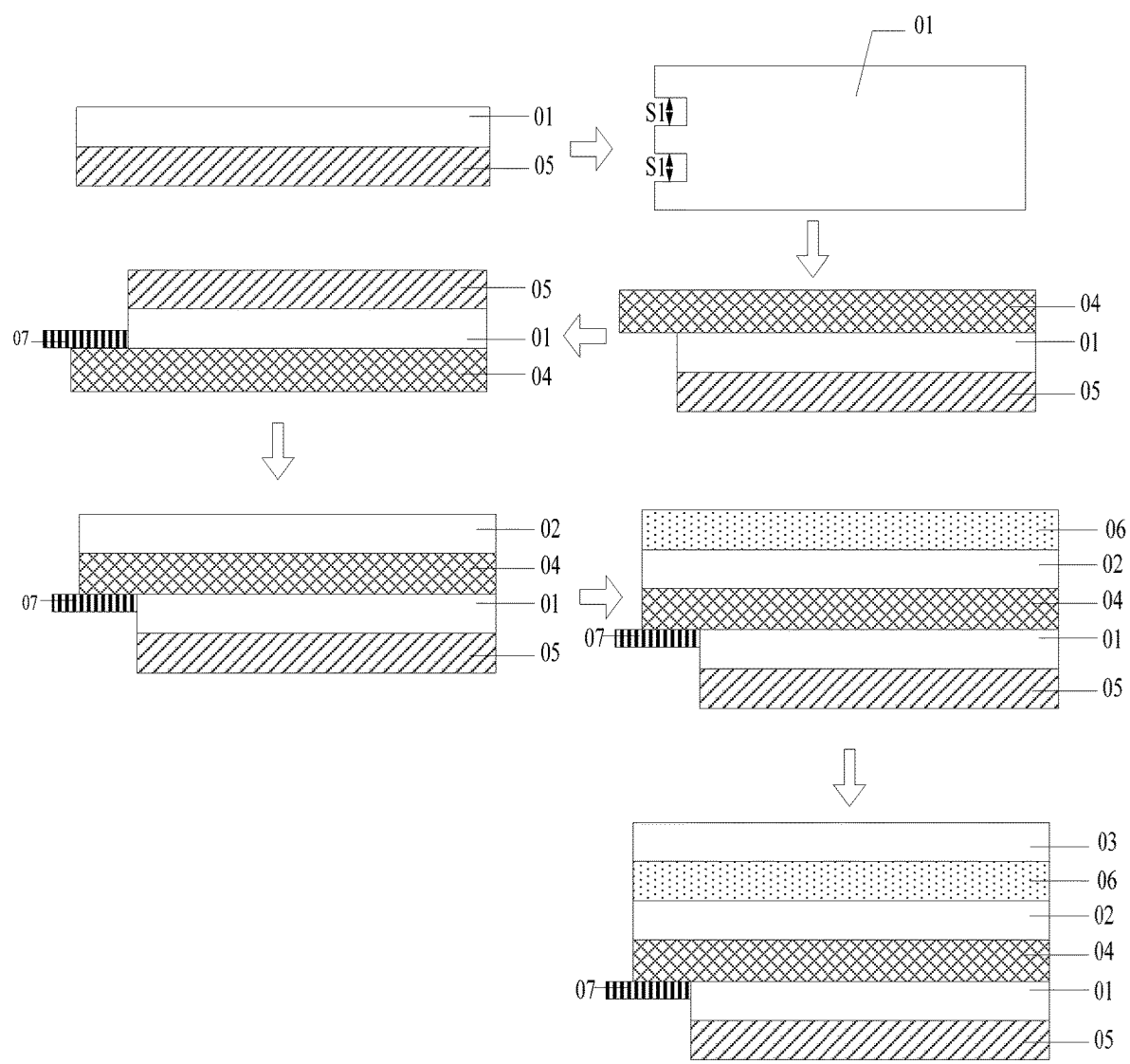
FIG. 7 is a schematic structural diagram corresponding to each step when adopting the method shown in FIG. 6.

In one embodiment, as shown in FIG. 6, the method includes:

S601, attaching the first bonding layer 01 on the polarizing function layer 05, as shown in FIG. 7;

S602, removing the preset area S1 of the polarizing function layer 05 and the preset area S1 of the first bonding layer 01 using a laser process, as shown in FIG. 7;

S603, transferring the touch function layer 04 pre-formed on the rigid base substrate to the first bonding layer 01 by means of transfer printing; neither the polarizing function layer 05 nor the first bonding layer 01 overlaps with the binding area S2 of the touch function layer 04 in the direction perpendicular to the touch function layer 04, as shown in FIG. 7;

S604, bounding the printed circuit board 07 in the binding area of the touch function layer 04, as shown in FIG. 7;

S605, attaching the second bonding layer 02 on the side, facing away from the first bonding layer 01, of the touch function layer 04, as shown in FIG. 7;

S606, forming the COP film layer 06 on the second bonding layer 02, as shown in FIG. 7;

S607, forming the third bonding layer 03 on the COP film layer 06, as shown in FIG. 7.

In this embodiment, as shown in FIG. 7, a touch module provided in the embodiments of the disclosure is formed by steps S601 to S607. In an optional implementation, in the above embodiment, after step S604, the second bonding layer 02 may be attached on the COP film layer 06 first, and then the second bonding layer 02 may be attached to the touch function layer 04, after which the third bonding layer 03 may be attached on the COP film layer 06. Of course, the second bonding layer 02 and the third bonding layer 03 may be attached on both sides of the COP film layer 06, and then the second bonding layer 02 is attached to the touch function layer 04, which is not limited here.

Figure 8:
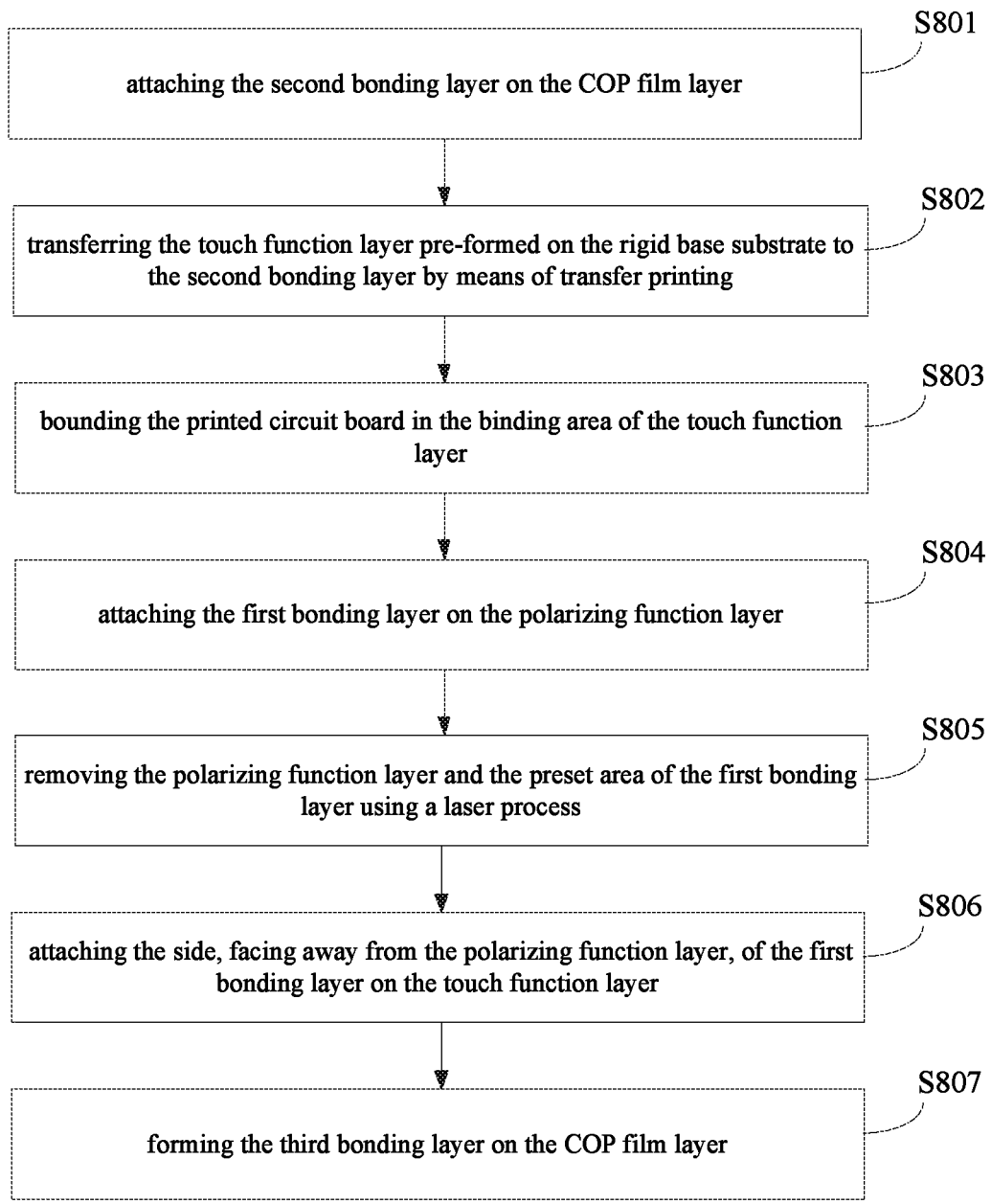
FIG. 8 is a flow chart of a preparation method of another touch module provided by some embodiments of the present disclosure.
Figure 9:
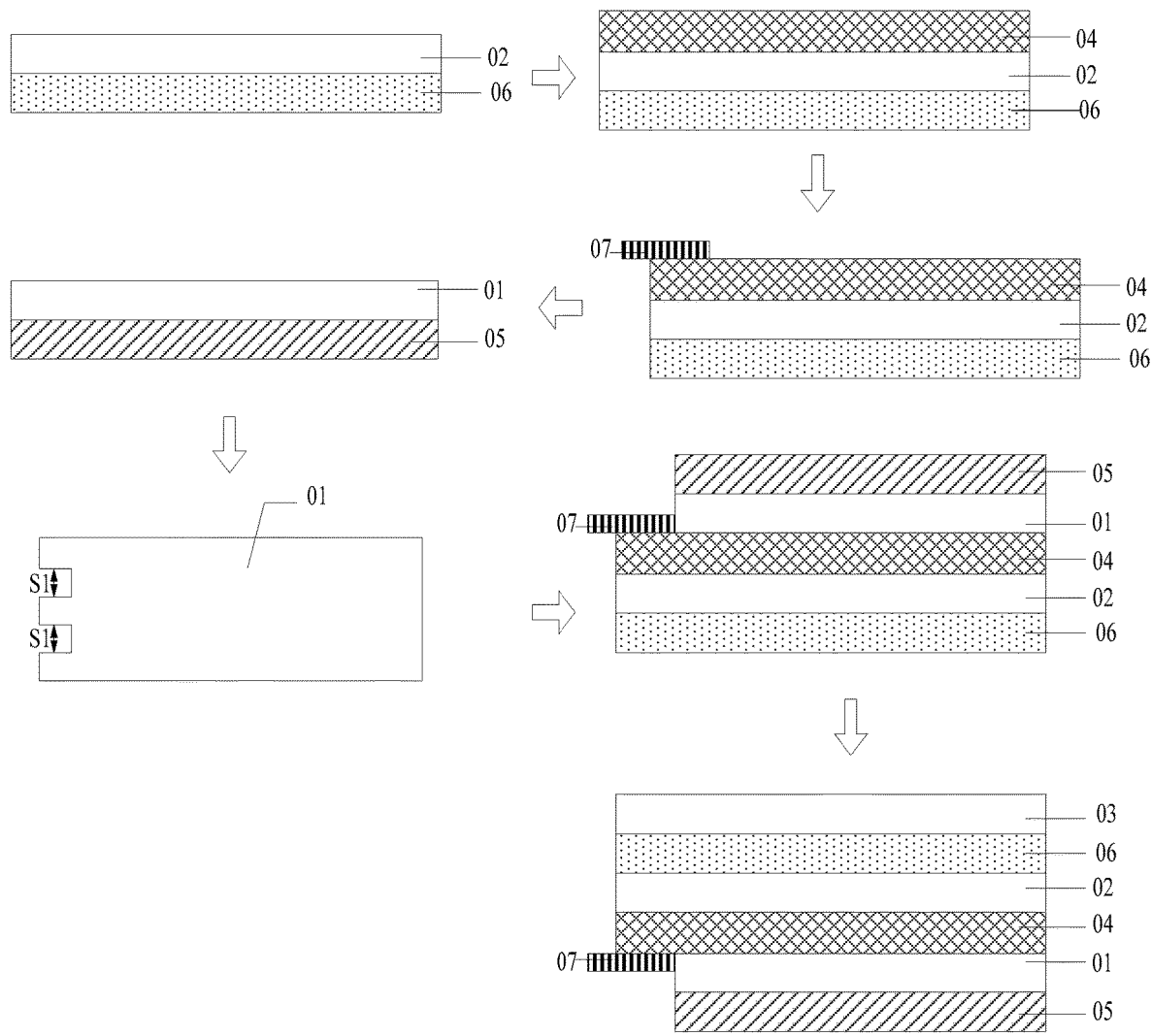
FIG. 9 is a schematic structural diagram corresponding to each step when adopting the preparation method shown in FIG. 8.

In another embodiment, as shown in FIG. 8, the method includes:

S801, attaching the second bonding layer 02 on the COP film layer 06, as shown in FIG. 9; S802, transferring the touch function layer 04 pre-formed on the rigid base substrate to the second bonding layer 02 by means of transfer printing, as shown in FIG. 9;

S803, bounding the printed circuit board 07 in the binding area of the touch function layer 04, as shown in FIG. 9;

S804, attaching the first bonding layer 01 on the polarizing function layer 05, as shown in FIG. 9;

S805, removing the polarizing function layer 05 and the preset area S1 of the first bonding layer 01 using a laser process, as shown in FIG. 9;

S806, attaching the side, facing away from the polarizing function layer 05, of the first bonding layer 01 on the touch function layer 04. neither the polarizing function layer 05 nor the first bonding layer 01 overlaps with the binding area S2 of the touch function layer 04 in the direction perpendicular to the touch function layer 04, as shown in FIG. 9;

S807, forming the third bonding layer 03 on the COP film layer 06, as shown in FIG. 9.

In this embodiment, as shown in FIG. 9, the touch module provided by the embodiments of the present disclosure is formed by steps S801 to step S807. In an optional implementation, in the above embodiment, step S807 may also precede any of step S801 to step S806, which is not limited herein.

In an optional implementation, in the method provided by the embodiments of the present disclosure, after the third bonding layer is formed on the COP film layer, a protective layer is generally also included on the side, facing away from the COP film layer, of the third bonding layer. The protective layer is used to protect the third bonding layer. When the touch module is combined with a display panel, the protective layer is stripped from the third bonding layer and the third bonding layer is attached to the display panel.

According to the above method provided by the embodiments of the present disclosure, the polarizing function layer and the COP film layer are attached to both sides of the touch function layer by the first bonding layer and the second bonding layer respectively, and the third bonding layer is attached to the side, facing away from the second bonding layer, of the COP film layer, so that the touch module can be attached to the display panel by the third bonding layer. The method has a relatively simple process flow and effectively reduces the noise of the display panel by having the second bonding layer, the COP film layer and the third bonding layer between the touch function layer and the display panel, thereby increasing the distance between the touch function layer and the display panel. In addition, the COP film layer can play a role of protection support, while the bonding layers can improve an effect of film layer rubbing, as well as adjust an effect of a bending neutral layer of the material, thus effectively regulating a force layer of the touch module, enhancing overall tensile resistance of the touch module, and finally ensuring that the overall touch module has an excellent bending characteristic. Moreover, neither the polarizing function layer nor the first bonding layer overlaps with the binding area of the touch function layer in the direction perpendicular to the touch function layer, thereby avoiding the generation of the air bubbles between the printed circuit board and the first bonding layer.

In an optional implementation, in the embodiments of the present disclosure, a thickness of each film layer is not specifically limited. For example, a thickness of the polarizaing function layer may be set at about 73 µm, a thickness of the first bonding layer may be set at about 15 µm, a thickness of the second bonding layer may be set at about 15 µm, a thickness of the COP film layer may be set at about 23 µm, and a thickness of the third bonding layer may be set at about 23 µm.

Further, in the method provided by the embodiments of the present disclosure, on the basis of the fixed thicknesses of the COP film layer, the polarizing function layer and the touch function layer, the thicknesses of the first bonding layer, the second bonding layer and the third bonding layer may be adjusted so that the touch function layer is in a bending neutral layer in the overall touch module, thereby effectively improving the bending characteristic of the touch function layer.

In the method provided by the embodiments of the present disclosure, the thicknesses of the second bonding layer, the COP film layer and the third bonding layer also need to be set taking into account the noise effect of the display panel on the touch function layer, and it is necessary to ensure that the touch function layer is not affected by electrodes in the display panel.

Based on the same inventive concept, the embodiments of the present disclosure further provide a touch module. The touch module is formed by adopting any one of the methods provided by the embodiments of the present disclosure. As shown in FIG. 1, the touch module includes: a polarizing function layer 05, a first bonding layer 01, a touch function layer 04, a second bonding layer 02, a COP film layer 06 and a third bonding layer 03 arranged successively in a stacked mode. Since the problem solving principle of the touch module is similar to that of the aforementioned method for preparing the touch module, the implementation of the touch module may be referred to the implementation of the aforementioned method for preparing the touch module, and the repetition will not be repeated.

The touch module provided by the embodiments of the present disclosure has a simple structure, so the method has a relatively simple process flow and effectively reduces the noise of the display panel by having the second bonding layer, the COP film layer and the third bonding layer between the touch function layer and the display panel, thereby increasing a distance between the touch function layer and the display panel. In addition, the COP film layer can play a role of protection support, while the bonding layers can improve an effect of film layer rubbing, as well as adjust an effect of a bending neutral layer of a material, thus effectively regulating a force layer of the touch module, enhancing overall tensile resistance of the touch module, and finally ensuring that the overall touch module has an excellent bending characteristic. Moreover, neither the polarizing function layer nor the first bonding layer overlaps with the binding area of the touch function layer in the direction perpendicular to the touch function layer, thereby avoiding the generation of air bubbles between the printed circuit board and the first bonding layer.

Optionally, in the touch module provided by the embodiment of the present disclosure, as shown in FIGS. 3a to 3c, neither the polarizing function layer 05 nor the first bonding layer 01 overlaps with a binding area S2 of the touch function layer 04 in a direction perpendicular to the touch function layer 04.

The touch module further includes a printed circuit board 07 bound in the binding area S2 of the touch function layer 04.

In the above embodiment, neither the polarizing function layer nor the first bonding layer overlaps with the binding area of the touch function layer in the direction perpendicular to the touch function layer, thus avoiding the generation of the air bubbles between the printed circuit board and the first bonding layer.

The above touch module provided by the embodiments of the present disclosure is particularly applicable to the field of flexible display. Of course, in an optional implementation, it is also applicable to the field of non-flexible display, which is not limited here.

Figure 10:
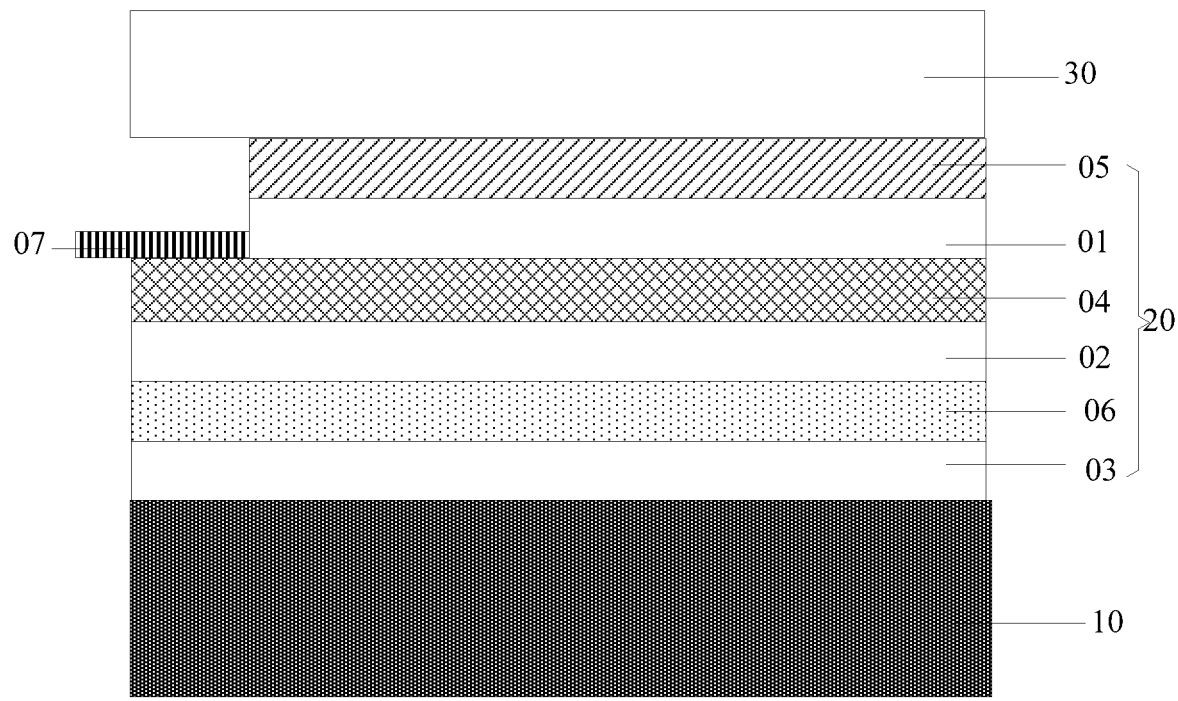
FIG. 10 is a schematic structural diagram of a display device provided by some embodiments of the present disclosure.

Based on the same inventive concept, the embodiments of the present disclosure further provide a display device, as shown in FIG. 10, including a display panel 10 and a touch module 20 arranged on a light emitting side of the display panel 10. The touch module 20 is any one of the touch modules provided by the embodiments of the present disclosure. A third bonding layer 03 of the touch module 20 is attached to display panel. Since the problem solving principle of the display device is similar to that of the aforementioned touch module, the implementation of the display device may be referred to the implementation of the aforementioned touch module, and the repetition will not be repeated.

Figure 11:
FIG. 11 is a schematic structural diagram of another display device provided by some embodiments of the present disclosure.

Optionally, the display device provided by the embodiments of the present disclosure, as shown in FIG. 11, further includes: a cover plate 30 arranged on a side, facing away from the display panel 10, of the touch module 20. When the touch module includes a printed circuit board 07, the display device further includes a frame sealer 40 filling between the cover plate 30 and the printed circuit board 70. In the embodiments, the frame sealer 40 is used to fill a gap between the cover plate 30 and the printed circuit board 07, and the frame sealer 40 is used to block water and oxygen to ensure that the display device has good closure.

In an optional implementation, when the display panel 10, the touch module 20 and the cover plate 30 are attached, the gap between the cover plate 30 and the printed circuit board 07 is coated with the frame sealer 40, followed by pressure, so that the sealer can be filled into the gap and subsequently cured. Because of this design, not only does it cause generation of any air bubbles, but it also performs sealing protect on a binding area, blocks water and oxygen outside and increases a bending force.

The display panel provided by the embodiments of the present disclosure may be liquid a crystal display panel, may also be an organic light emitting diode (OLED) display panel, of course, may also be other display panels, which is not limited here.

According to the above touch module, the preparation method therefor, and the display device provided by the embodiments of the present disclosure, the polarizing function layer and the COP film layer are attached to both sides of the touch function layer by the first bonding layer and the second bonding layer respectively, and the third bonding layer is attached to the side, facing away from the second bonding layer, of the COP film layer, so that the touch module can be attached to the display panel by the third bonding layer. The method has a relatively simple process flow and effectively reduces the noise of the display panel by having the second bonding layer, the COP film layer and the third bonding layer between the touch function layer and the display panel, thereby increasing the distance between the touch function layer and the display panel. Moreover, the COP film layer can play a role of protection support, while the bonding layers can improve an effect of film layer rubbing, as well as adjust an effect of the bending neutral layer of the material, thus effectively regulating a force layer of the touch module, enhancing overall tensile resistance of the touch module, and finally ensuring that the overall touch module has an excellent bending characteristic.

It is clear that those of skill in the art can make various modifications and variations to the present disclosure without departing from the spirit and scope of the present disclosure. Thus, if such modifications and variations of the present disclosure are within the scope of the claims of the present disclosure and their technical equivalents, the present disclosure is intended to include such modifications and variations as well.

What is claimed is:

1. A method for preparing a touch module, comprising:
    attaching a polarizing function layer to a side of a touch function layer by a first bonding layer;
    attaching a cyclo olefin polymer (COP) film layer to another side of the touch function layer by a second bonding layer; and
    attaching a third bonding layer to a side, facing away from the second bonding layer, of the COP film layer;
    wherein the attaching the polarizing function layer to the side of the touch function layer by the first bonding layer, and the attaching the COP film layer to another side of the touch function layer by the second bonding layer comprises:
        directly attaching the first bonding layer on the polarizing function layer first; then directly transferring the touch function layer pre-formed on a rigid base substrate to the first bonding layer by means of transfer printing; and then directly attaching the COP film layer on the touch function layer through the second bonding layer;
    or,
        directly attaching the second bonding layer on the COP film layer first; then directly transferring the touch function layer pre-formed on a rigid base substrate to the second bonding layer by means of transfer printing; and then directly attaching the polarizing function layer on the touch function layer through the first bonding layer;
    wherein before the transferring the touch function layer pre-formed on the rigid base substrate to the first bonding layer by means of transfer printing, the method further comprises: removing a preset area of the polarizing function layer; wherein after the touch function layer is transferred to the first bonding layer, neither the polarizing function layer nor the first bonding layer overlaps with a binding area of the touch function layer in a direction perpendicular to the touch function layer; and after the transferring the touch function layer pre-formed on the rigid base substrate to the first bonding layer by means of transfer printing, the method further comprises: binding a printed circuit board in the binding area of the touch function layer; and
    wherein before the attaching the polarizing function layer on the touch function layer through the first bonding layer, the method further comprising: attaching the first bonding layer on the polarizing function layer; removing a preset area of the polarizing function layer and a preset area of the first bonding layer; wherein after the attaching the polarizing function layer on the touch function layer, neither the polarizing function layer nor the first bonding layer overlaps with a binding area of the touch function layer in a direction perpendicular to the touch function layer; and binding a printed circuit board in the binding area of the touch function layer.

2. The method according to claim 1, wherein the method further comprises: a process of pre-forming the touch function layer on the rigid base substrate;
    wherein the process of pre-forming the touch function layer on the rigid base substrate, comprises:
        forming a transfer-printing support layer on the rigid base substrate; and
        forming the touch function layer on the transfer-printing support layer.

3. The method according to claim 1, before the COP film layer is attached to the second bonding layer, further comprising:
    performing plasma treatment on a surface, to be attached to the second bonding layer, of the COP film layer.

4. The method according to claim 1, before the COP film layer is attached to the third bonding layer, further comprising:
    performing plasma treatment on a surface, to be attached to the third bonding layer, of the COP film layer.

5. A touch module, wherein the touch module is prepared by adopting the method according to claim 1; and the touch module comprises: the polarizing function layer, the first bonding layer, the touch function layer, the second bonding layer, the COP film layer and the third bonding layer arranged successively in a stacked mode.

6. The touch module according to claim 5, wherein neither the polarizing function layer nor the first bonding layer overlaps with a binding area of the touch function layer in a direction perpendicular to the touch function layer; and
the touch module further comprises a printed circuit board bound in the binding area of the touch function layer.

7. The touch module according to claim 6, wherein an area of a preset area of the polarizing function layer is larger than or equal to an area of the binding area.

8. A display device, wherein the display device comprises a display panel and the touch module according to claim 5 arranged on a light emitting side of the display panel; and
the third bonding layer in the touch module is attached to the display panel.

9. The display device according to claim 8, wherein the display device further comprises: a cover plate arranged on a side, facing away from the display panel, of the touch module; and
when the touch module comprises a printed circuit board, the display device further comprises a frame sealant filling between the cover plate and the printed circuit board.

\* \* \* \* \*